(12) United States Patent
Kajiya et al.

(10) Patent No.: US 9,118,076 B2
(45) Date of Patent: *Aug. 25, 2015

(54) POSITIVE ELECTRODE ACTIVE MATERIAL FOR LITHIUM ION BATTERY, POSITIVE ELECTRODE FOR LITHIUM ION BATTERY AND LITHIUM ION BATTERY

(75) Inventors: Yoshio Kajiya, Kitaibaraki (JP); Kentaro Okamoto, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/576,548

(22) PCT Filed: Feb. 4, 2011

(86) PCT No.: PCT/JP2011/052394
§ 371 (c)(1),
(2), (4) Date: Aug. 1, 2012

(87) PCT Pub. No.: WO2011/096522
PCT Pub. Date: Aug. 11, 2011

(65) Prior Publication Data
US 2012/0292562 A1 Nov. 22, 2012

(30) Foreign Application Priority Data
Feb. 5, 2010 (JP) ................. 2010-024290

(51) Int. Cl.
*H01M 4/525* (2010.01)
*H01M 4/485* (2010.01)
*H01M 4/505* (2010.01)
*H01M 10/0525* (2010.01)

(52) U.S. Cl.
CPC ............. *H01M 4/525* (2013.01); *H01M 4/485* (2013.01); *H01M 4/505* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| 2,165,128 | A  | 7/1939  | Cheesman |
| 4,443,186 | A  | 4/1984  | Shell |
| 4,469,654 | A  | 9/1984  | Haskett et al. |
| 5,393,622 | A  | 2/1995  | Nitta et al. |
| 5,478,674 | A  | 12/1995 | Miyasaka |
| 5,759,714 | A  | 6/1998  | Matsufuji et al. |
| 6,037,095 | A  | 3/2000  | Miyasaka |
| 6,123,911 | A  | 9/2000  | Yamaguchi et al. |
| 6,423,447 | B1 | 7/2002  | Ohsaki et al. |
| 6,582,854 | B1 | 6/2003  | Qi et al. |
| 6,984,469 | B2 | 1/2006  | Kweon et al. |
| 7,332,248 | B2 | 2/2008  | Kase et al. |
| 7,410,728 | B1 | 8/2008  | Fujimoto et al. |
| 7,645,542 | B2 | 1/2010  | Kase et al. |
| 8,354,191 | B2 | 1/2013  | Shizuka et al. |
| 8,623,551 | B2 | 1/2014  | Kawahashi et al. |
| 8,748,041 | B2 | 6/2014  | Satoh et al. |
| 8,993,160 | B2 | 3/2015  | Nagase |
| 2002/0106561 | A1 | 8/2002  | Lee et al. |
| 2003/0082448 | A1 | 5/2003  | Cho et al. |
| 2003/0104279 | A1 | 6/2003  | Miyazaki et al. |
| 2003/0211391 | A1 | 11/2003 | Cho et al. |
| 2004/0053134 | A1 | 3/2004  | Ozaki et al. |
| 2004/0110063 | A1 | 6/2004  | Uchitomi et al. |
| 2004/0197658 | A1 | 10/2004 | Kase et al. |
| 2005/0079416 | A1 | 4/2005  | Ohzuku et al. |
| 2005/0142442 | A1* | 6/2005 | Yuasa et al. ................. 429/220 |
| 2005/0158546 | A1 | 7/2005  | Shizuka |
| 2006/0083989 | A1 | 4/2006  | Suhara et al. |
| 2006/0121350 | A1 | 6/2006  | Kajiya et al. |
| 2006/0127765 | A1 | 6/2006  | Machida et al. |
| 2006/0204849 | A1 | 9/2006  | Saito et al. |
| 2006/0233696 | A1 | 10/2006 | Paulsen et al. |
| 2006/0281005 | A1 | 12/2006 | Cho et al. |
| 2007/0015058 | A1 | 1/2007  | Takezawa et al. |
| 2007/0141469 | A1 | 6/2007  | Tokunaga et al. |
| 2007/0202405 | A1 | 8/2007  | Shizuka et al. |
| 2007/0248883 | A1 | 10/2007 | Oda et al. |
| 2007/0298512 | A1 | 12/2007 | Park et al. |
| 2008/0044736 | A1 | 2/2008  | Nakura |
| 2008/0081258 | A1 | 4/2008  | Kim et al. |
| 2009/0117464 | A1 | 5/2009  | Cho et al. |

(Continued)

FOREIGN PATENT DOCUMENTS

| CN | 1520621 A | 8/2004 |
| CN | 1701451 A | 11/2005 |

(Continued)

OTHER PUBLICATIONS

International Search Report mailed Jun. 8, 2010 in co-pending PCT application No. PCT/JP2010/053443.
International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in co-pending PCT application No. PCT/JP2011/072860.

(Continued)

*Primary Examiner* — Patrick Ryan
*Assistant Examiner* — Haixia Zhang
(74) *Attorney, Agent, or Firm* — Nields, Lemack & Frame, LLC

(57) ABSTRACT

The present invention provides a positive electrode active material for a lithium ion battery with excellent battery characteristics can be provided. The positive electrode active material for a lithium ion battery is represented by the following composition formula:

$Li_xNi_{1-y}M_yO_{2+\alpha}$ (in the formula, M represents at least one selected from Sc, Ti, V, Cr, Mn, Fe, Co, Cu, Zn, Ga, Ge, Al, Bi, Sn, Mg, Ca, B, and Zr, $0.9 \leq x \leq 1.2$, $0 < y \leq 0.7$, and $\alpha > 0.1$).

9 Claims, No Drawings

(56) References Cited

U.S. PATENT DOCUMENTS

| | | | |
|---|---|---|---|
| 2009/0117469 A1 | 5/2009 | Hiratsuka et al. | |
| 2009/0148772 A1 | 6/2009 | Kawasato et al. | |
| 2009/0233176 A1 | 9/2009 | Kita et al. | |
| 2009/0286164 A1 | 11/2009 | Wada et al. | |
| 2009/0289218 A1 | 11/2009 | Kajiya et al. | |
| 2009/0299922 A1 | 12/2009 | Malcus et al. | |
| 2009/0305136 A1 | 12/2009 | Yada et al. | |
| 2010/0015514 A1 | 1/2010 | Miyagi et al. | |
| 2010/0019194 A1 | 1/2010 | Fujiwara et al. | |
| 2010/0112447 A1 | 5/2010 | Yamamoto et al. | |
| 2010/0143583 A1 | 6/2010 | Honda et al. | |
| 2010/0183922 A1 | 7/2010 | Cho et al. | |
| 2010/0209757 A1 | 8/2010 | Ooyama et al. | |
| 2010/0209771 A1* | 8/2010 | Shizuka et al. | 429/207 |
| 2010/0227222 A1 | 9/2010 | Chang et al. | |
| 2011/0031437 A1 | 2/2011 | Nagase et al. | |
| 2011/0033749 A1 | 2/2011 | Uchida et al. | |
| 2011/0076558 A1 | 3/2011 | Miyazaki et al. | |
| 2011/0250499 A1 | 10/2011 | Hiratsuka | |
| 2012/0034525 A1 | 2/2012 | Satoh et al. | |
| 2012/0231342 A1 | 9/2012 | Satoh et al. | |
| 2012/0231343 A1 | 9/2012 | Nagase et al. | |
| 2012/0244434 A1 | 9/2012 | Nagase | |
| 2012/0319036 A1 | 12/2012 | Kajiya et al. | |
| 2012/0319037 A1 | 12/2012 | Kawahashi et al. | |
| 2012/0319039 A1 | 12/2012 | Satoh | |
| 2012/0319040 A1 | 12/2012 | Okamoto et al. | |
| 2012/0321956 A1 | 12/2012 | Kawahashi et al. | |
| 2012/0326080 A1 | 12/2012 | Okamoto et al. | |
| 2012/0326098 A1 | 12/2012 | Satoh | |
| 2012/0326099 A1 | 12/2012 | Satoh | |
| 2012/0326101 A1 | 12/2012 | Satoh | |
| 2012/0326102 A1 | 12/2012 | Satoh | |
| 2013/0001463 A1 | 1/2013 | Okamoto et al. | |
| 2013/0004849 A1 | 1/2013 | Satoh | |
| 2013/0043428 A1 | 2/2013 | Kawahashi et al. | |
| 2013/0108921 A1 | 5/2013 | Kase et al. | |
| 2013/0143121 A1 | 6/2013 | Kobayashi et al. | |
| 2013/0175470 A1 | 7/2013 | Kajiya et al. | |
| 2013/0221271 A1 | 8/2013 | Nagase et al. | |
| 2013/0316239 A1 | 11/2013 | Okamoto | |
| 2014/0306152 A1 | 10/2014 | Okamoto | |
| 2014/0339465 A1 | 11/2014 | Okamoto | |
| 2014/0339466 A1 | 11/2014 | Okamoto | |
| 2015/0123029 A1 | 5/2015 | Nagase et al. | |

FOREIGN PATENT DOCUMENTS

| | | | |
|---|---|---|---|
| CN | 1710735 A | 12/2005 | |
| CN | 1947288 A | 4/2007 | |
| CN | 101478044 A | 7/2009 | |
| EP | 0794155 A1 | 9/1997 | |
| EP | 0903796 A1 | 3/1999 | |
| EP | 1244164 A1 | 9/2002 | |
| EP | 1317008 A2 | 6/2003 | |
| EP | 1391950 A1 | 2/2004 | |
| EP | 1450423 A1 | 8/2004 | |
| EP | 1742281 A1 | 1/2007 | |
| EP | 2023426 A1 | 2/2009 | |
| EP | 2207226 A1 | 7/2010 | |
| EP | 2207227 A1 | 7/2010 | |
| EP | 2219251 A1 | 8/2010 | |
| EP | 2533333 A1 | 12/2012 | |
| JP | 4-328277 A | 11/1992 | |
| JP | 6-275274 A | 9/1994 | |
| JP | 7-29603 A | 1/1995 | |
| JP | 7-211311 A | 8/1995 | |
| JP | 8-138669 A | 5/1996 | |
| JP | 8-213015 A | 8/1996 | |
| JP | 09-82325 A | 3/1997 | |
| JP | 9-120813 A | 5/1997 | |
| JP | 9-270257 A | 10/1997 | |
| JP | 10-83815 A | 3/1998 | |
| JP | 10-116618 A | 5/1998 | |
| JP | 10-188986 A | 7/1998 | |
| JP | 10-206322 A | 8/1998 | |
| JP | 10-208744 A | 8/1998 | |
| JP | 10-302779 A | 11/1998 | |
| JP | 10-321224 A | 12/1998 | |
| JP | 11-16573 A | 1/1999 | |
| JP | 11-67205 A | 3/1999 | |
| JP | 11-273676 A | 10/1999 | |
| JP | 11-292542 A | 10/1999 | |
| JP | 11-307094 A | 11/1999 | |
| JP | 11-345615 A | 12/1999 | |
| JP | 2000-30693 A | 1/2000 | |
| JP | 2000-72445 A | 3/2000 | |
| JP | 2000-149945 A | 5/2000 | |
| JP | 2000-215884 A | 8/2000 | |
| JP | 2000-348721 A | 12/2000 | |
| JP | 2001-110420 A | 4/2001 | |
| JP | 2001-148249 A | 5/2001 | |
| JP | 2001-223008 A | 8/2001 | |
| JP | 2001-266851 A | 9/2001 | |
| JP | 2002-63901 A | 2/2002 | |
| JP | 2002-124261 A | 4/2002 | |
| JP | 3276183 B2 | 4/2002 | |
| JP | 2002-164053 A | 6/2002 | |
| JP | 2002-203552 A | 7/2002 | |
| JP | 2002-216745 A | 8/2002 | |
| JP | 2002-260655 A | 9/2002 | |
| JP | 2002-289261 A | 10/2002 | |
| JP | 2002-298914 A | 10/2002 | |
| JP | 3334179 B2 | 10/2002 | |
| JP | 2003-7299 A | 1/2003 | |
| JP | 2003-17052 A | 1/2003 | |
| JP | 2003-81637 A | 3/2003 | |
| JP | 2003-151546 A | 5/2003 | |
| JP | 2003-229129 A | 8/2003 | |
| JP | 2004-6264 A | 1/2004 | |
| JP | 2004-146374 A | 5/2004 | |
| JP | 2004-172109 A | 6/2004 | |
| JP | 2004-193115 A | 7/2004 | |
| JP | 2004-214187 A | 7/2004 | |
| JP | 2004-227790 A | 8/2004 | |
| JP | 2004-253169 A | 9/2004 | |
| JP | 2004-273451 A | 9/2004 | |
| JP | 2004-355824 A | 12/2004 | |
| JP | 2004-356094 A | 12/2004 | |
| JP | 2005-11713 A | 1/2005 | |
| JP | 2005-44743 A | 2/2005 | |
| JP | 2005-53764 A | 3/2005 | |
| JP | 2005-56602 A | 3/2005 | |
| JP | 2005-60162 A | 3/2005 | |
| JP | 2005-75691 A | 3/2005 | |
| JP | 2005-183366 A | 7/2005 | |
| JP | 2005-225734 A | 8/2005 | |
| JP | 2005-235624 A | 9/2005 | |
| JP | 2005-243636 A | 9/2005 | |
| JP | 2005-251700 A | 9/2005 | |
| JP | 2005-285572 A | 10/2005 | |
| JP | 2005-289700 A | 10/2005 | |
| JP | 2005-302507 A | 10/2005 | |
| JP | 2005-302628 A | 10/2005 | |
| JP | 2005-324973 A | 11/2005 | |
| JP | 2005-327644 A | 11/2005 | |
| JP | 2005-332707 A | 12/2005 | |
| JP | 2005-347134 A | 12/2005 | |
| JP | 2006-4724 A | 1/2006 | |
| JP | 2006-19229 A | 1/2006 | |
| JP | 2006-19310 A | 1/2006 | |
| JP | 2006-54159 A | 2/2006 | |
| JP | 2006-107818 A | 4/2006 | |
| JP | 2006-107845 A | 4/2006 | |
| JP | 2006-127923 A | 5/2006 | |
| JP | 2006-127955 A | 5/2006 | |
| JP | 2006-134816 A | 5/2006 | |
| JP | 2006-134852 A | 5/2006 | |
| JP | 2006-156126 A | 6/2006 | |
| JP | 2006-156235 A | 6/2006 | |
| JP | 2006-164758 A | 6/2006 | |
| JP | 2006-286614 A | 10/2006 | |
| JP | 3835266 B2 | 10/2006 | |

(56) References Cited

FOREIGN PATENT DOCUMENTS

| JP | 2006-302542 | A | | 11/2006 |
|---|---|---|---|---|
| JP | 2006-351379 | A | | 12/2006 |
| JP | 2007-48744 | A | | 2/2007 |
| JP | 2007-95443 | A | | 4/2007 |
| JP | 2007-194202 | A | | 8/2007 |
| JP | 2007-214138 | A | | 8/2007 |
| JP | 2007-226969 | A | | 9/2007 |
| JP | 2007-227368 | A | | 9/2007 |
| JP | 2007-257890 | A | | 10/2007 |
| JP | 2007-280723 | A | | 10/2007 |
| JP | 2007257890 | A | * | 10/2007 |
| JP | 2008-13405 | A | | 1/2008 |
| JP | 4070585 | B2 | | 4/2008 |
| JP | 2008-103132 | A | | 5/2008 |
| JP | 2008-181708 | A | | 8/2008 |
| JP | 2008-192547 | A | | 8/2008 |
| JP | 2008-266136 | A | | 11/2008 |
| JP | 2008-277106 | A | | 11/2008 |
| JP | 4175026 | B2 | | 11/2008 |
| JP | 2008-544468 | A | | 12/2008 |
| JP | 2009-117365 | A | | 5/2009 |
| JP | 2009-135070 | A | | 6/2009 |
| JP | 2009-151959 | A | | 7/2009 |
| JP | 4287901 | B2 | | 7/2009 |
| JP | 2009-289726 | A | | 12/2009 |
| JP | 2010-15959 | A | | 1/2010 |
| JP | 2010-47466 | A | | 3/2010 |
| JP | 2010-192200 | A | | 9/2010 |
| JP | 2011-44364 | A | | 3/2011 |
| JP | 2012-169224 | A | | 9/2012 |
| JP | 2012-243572 | A | | 12/2012 |
| JP | 2013-152911 | A | | 8/2013 |
| KR | 10-2010-0060362 | A | | 6/2010 |
| TW | 363940 | | | 7/1999 |
| WO | 02/086993 | A1 | | 10/2002 |
| WO | 03/003489 | A1 | | 1/2003 |
| WO | 2004/064180 | A1 | | 7/2004 |
| WO | 2007/072759 | A1 | | 6/2007 |
| WO | 2008/084679 | A1 | | 7/2008 |
| WO | 2009/011157 | A1 | | 1/2009 |
| WO | 2009/060603 | A1 | | 5/2009 |
| WO | 2009/063838 | A1 | | 5/2009 |
| WO | 2009/128289 | A1 | | 10/2009 |
| WO | 2010/049977 | A1 | | 5/2010 |
| WO | 2010/113512 | A1 | | 10/2010 |
| WO | 2010/113583 | A1 | | 10/2010 |
| WO | 2011/007751 | A1 | | 1/2011 |
| WO | 2011/065391 | A1 | | 6/2011 |
| WO | 2011/108720 | A1 | | 9/2011 |
| WO | 2011/122448 | A1 | | 10/2011 |
| WO | 2012/098724 | A1 | | 7/2012 |
| WO | 2012/132071 | A1 | | 10/2012 |
| WO | 2012/132072 | A1 | | 10/2012 |
| WO | 2012/157143 | A1 | | 11/2012 |

OTHER PUBLICATIONS

International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in corresponding PCT application No. PCT/JP2011/052394.
International Preliminary Report on Patentability mailed Oct. 11, 2012 in corresponding PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of LiCoO2—LiNi0.5Mn0.5O2—Li2MnO3 solid solutions with high Mn contents", Sun, et al.
International Preliminary Report on Patentability mailed Nov. 22, 2012 in co-pending PCT application No. PCT/JP2011/054938.
International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action-Restriction-mailed Mar. 12, 2013 in co-pending U.S. Appl. No. 13/508,887.
Office Action mailed Mar. 13, 2013 in co-pending U.S. Appl. No. 13/582,091.
International Preliminary Report on Patentability mailed Sep. 26, 2013 in co-pending PCT application No. PCT/JP2011/053271.
International Preliminary Report on Patentability mailed Oct. 10, 2013 in co-pending PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-50325.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2003 in co-pending U.S. Appl. No. 13/508,887.

(56) References Cited

OTHER PUBLICATIONS

Office Action mailed Sep. 17, 2013 in co-pending U.S. Appl. No. 13/856,514.
Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Oct. 10, 2013 in co-pending PCT application No. PCT/JP2012/057974.
Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
Notice of Allowance mailed Mar. 20, 2014 in co-pending U.S. Appl. No. 13/258,120.
Office Action mailed Dec. 4, 2013 in co-pending U.S. Appl. No. 13/508,880.
Final Rejection mailed Feb. 27, 2014 in co-pending U.S. Appl. No. 13/856,514.
Office Action mailed Dec. 18, 2013 in co-pending U.S. Appl. No. 13/514,080.
Final Rejection mailed Jan. 27, 2014 in co-pending U.S. Appl. No. 13/581,546.
Final Rejection mailed Jan. 24, 2014 in co-pending U.S. Appl. No. 13/582,067.
Final Rejection mailed Jan. 27, 2014 in co-pending U.S. Appl. No. 13/581,814.
Notice of Allowance mailed Nov. 6, 2013 in U.S. Appl. No. 13/582,091, now U.S. Pat. No. 8,623,551.
Final Rejection mailed Feb. 20, 2014 in co-pending U.S. Appl. No. 13/582,096.
Final Rejection mailed Feb. 7, 2014 in co-pending U.S. Appl. No. 13/582,101.
Final Rejection mailed Feb. 18, 2014 in co-pending U.S. Appl. No. 13/582,113.
European communication issued May 9, 2014 in corresponding European patent application No. EP 11739870.1.
Chinese communication dated May 12, 2014 in co-pending Chinese patent application No. CN 201180008573.3.
European communication issued May 9, 2014 in co-pending European patent application No. EP 11750704.6.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Dec. 25, 2012 in co-pending PCT application No. PCT/JP2013/064941.
Final Rejection mailed Jun. 18, 2014 in co-pending U.S. Appl. No. 13/508,880.
Final Rejection mailed Jun. 3, 2014 in co-pending U.S. Appl. No. 13/514,080.
Office Action mailed Jul. 8, 2014 in co-pending U.S. Appl. No. 13/576,753.
European communication dated Oct. 27, 2014 in co-pending European patent application No. EP 10839166.5.
European communication dated Nov. 5, 2014 in co-pending European patent application No. EP 11856183.6.
European communication dated Oct. 20, 2014 in co-pending European patent application No. EP 12763420.2.
Office Action mailed Nov. 5, 2014 in co-pending U.S. Appl. No. 13/582,087.
Office Action mailed Nov. 14, 2014 in co-pending U.S. Appl. No. 13/582,096.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of the Electrochemical Society, 155 (3), 2008, pp. A239-A245, "Storage Characteristics of LiNi0.8Co0.1+xMn0.1—xO2 (x=0, 0.03, and 0.06) Cathode Materials for Lithium Ion Batteries", Eom, et al.
Machine English translation for CN 1710735 (2005), 9 pages, European Patent Office, http://translationportal.epo.org . . . , retrieved from the internet Oct. 6, 2014.
Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Oct. 9, 2014 in co-pending U.S. Appl. No. 13/695,663.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
European Communication dated Jan. 5, 2015 in co-pending European patent application No. 11842456.3.
European Communication dated Dec. 9, 2014 in co-pending European patent application No. 11750768.1.
Japanese communication mailed Apr. 7, 2015 in co-pending Japanese patent application No. 2012-503258.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Preliminary Report on Patentability mailed Mar. 19, 2015 in co-pending PCT application No. PCT/JP2013/064941.
International Search Report mailed Jan. 7, 2014 in co-pending PCT application No. PCT/JP2013/076598.
International Preliminary Report on Patentability mailed Apr. 2, 2014 in co-pending PCT application No. PCT/JP2013/076598.
Journal of the the Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May, 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.

(56) References Cited

OTHER PUBLICATIONS

Wikipedia, Karl Fischer Titration article, Waybackmachine.com snapshot dtd., Sep. 12, 2010, 2 pages.
Office Action mailed Feb. 25, 2015 in co-pending U.S. Appl. No. 13/508,880.
Final Rejection mailed Feb. 24, 2015 in co-pending U.S. Appl. No. 13/695,663.
Notice of Allowance mailed Jan. 15, 2015 in co-pending U.S. Appl. No. 13/514,080.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Office Action mailed Mar. 25, 2015 in co-pending U.S. Appl. No. 13/581,423.
Final Rejection mailed Feb. 12, 2015 in co-pending U.S. Appl. No. 13/582,089.
Final Rejection mailed Feb. 27, 2015 in co-pending U.S. Appl. No. 13/581,730.
Final Rejection mailed Feb. 13, 2015 in co-pending U.S. Appl. No. 13/582,087.
Notice of Allowance mailed May 20, 2015 in co-pending U.S. Appl. No. 13/582,087.
Office Action mailed Feb. 26, 2015 in co-pending U.S. Appl. No. 13/582,101.
Office Action mailed Feb. 26, 2015 in co-pending U.S. Appl. No. 13/582,113.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed May 14, 2015 in co-pending U.S. Appl. No. 13/984,947.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.

* cited by examiner

POSITIVE ELECTRODE ACTIVE MATERIAL FOR LITHIUM ION BATTERY, POSITIVE ELECTRODE FOR LITHIUM ION BATTERY AND LITHIUM ION BATTERY

TECHNICAL FIELD OF THE INVENTION

The present invention relates to a positive electrode active material for a lithium ion battery, a positive electrode for a lithium ion battery, and a lithium ion battery.

BACKGROUND OF THE INVENTION

As a positive electrode active material of a lithium ion battery, a lithium-containing transition metal oxide is generally used. Specifically, lithium cobaltate ($LiCoO_2$), lithium nickelate ($LiNiO_2$), lithium manganate ($LiMn_2O_4$) and the like are used, and in order to improve characteristics (high capacity, cycle characteristics, storage characteristics, reduced internal resistance, or rate characteristics) or safety, using them as a composite is under progress. For large scale application like loading in an automobile or road leveling, the lithium ion battery is now required to have characteristics that are different from those required for a cellular phone or a personal computer.

For improvement of characteristics of a battery, various methods have been conventionally employed. For example, Patent document 1 discloses a method of producing a positive electrode material for a lithium secondary battery, which is characterized in that lithium nickel composite oxide having the composition represented by $Li_xNi_{1-y}M_yO_{2-\delta}$ ($0.8 \leq x \leq 1.3$, $0 < y \leq 0.5$, M represents at least one element selected from a group consisting of Co, Mn, Fe, Cr, V, Ti, Cu, Al, Ga, Bi, Sn, Zn, Mg, Ge, Nb, Ta, Be, B, Ca, Sc and Zr, and δ corresponds to either a deficient oxygen amount or an excess oxygen amount, and $-0.1 < \delta < 0.1$) is passed through a classifier to separate those having large particle diameter from those having small particle diameter such that equilibrium separation particle diameter Dh equals to 1 to 10 μm, and those having large particle diameter are admixed with those having small particle diameter with weight ratio of 0:100 to 100:0. It is described that, using the method, a positive electrode material for a lithium secondary battery with various balances between rate characteristics and capacity can be easily manufactured.

(Patent document 1) Japanese Patent No. 4175026

SUMMARY OF THE INVENTION

The lithium nickel composite oxide disclosed in Patent document 1 has an excess oxygen amount in the composition formula. However, as a high quality positive electrode active material for a lithium ion battery, there is still a need for an improvement.

Under the circumstances, an object of the invention is to provide a positive electrode active material for a lithium ion battery having excellent battery characteristics.

As a result of intensive studies, inventors of the invention found that there is a close relationship between an oxygen amount in a positive electrode active material and battery characteristics. Specifically, it was found that particularly favorable battery characteristics are obtained when an oxygen amount in a positive electrode active material is the same or greater than a certain value.

One aspect of the invention that is completed according to the findings described above is related to a positive electrode active material for a lithium ion battery which is represented by the following composition formula:

$$Li_xNi_{1-y}M_yO_{2+\alpha}$$

(in the formula, M represents at least one selected from Sc, Ti, V, Cr, Mn, Fe, Co, Cu, Zn, Ga, Ge, Al, Bi, Sn, Mg, Ca, B, and Zr, $0.9 \leq x \leq 1.2$, $0 < y \leq 0.7$, and $\alpha > 0.1$).

According to one embodiment of the positive electrode active material for a lithium ion battery according to the invention, M is at least one selected from Mn and Co.

According to another embodiment of the positive electrode active material for a lithium ion battery according to the invention, $\alpha > 0.15$ in the composition formula.

According to still another embodiment of the positive electrode active material for a lithium ion battery according to the invention, $\alpha > 0.20$ in the composition formula.

According to still another embodiment of the positive electrode active material for a lithium ion battery according to the invention, ratio of peak strength (Ps104) on (104) plane to peak strength (Ps003) on (003) plane, that is, (Ps104/Ps003), is 0.9 or less and 2θ of (110) plane is 64.6° or more according to powder X-ray diffraction.

According to still another embodiment of the positive electrode active material for a lithium ion battery according to the invention, the ratio of peak strength (Ps104/Ps003) is 0.85 or less.

According to still another embodiment of the positive electrode active material for a lithium ion battery according to the invention, 2θ of (110) plane is 64.7° or more.

According to still another embodiment of the positive electrode active material for a lithium ion battery according to the invention, 2θ of (018) plane is 64.45° or less and difference in 2θ between (018) plane and (110) plane is more than 0.1°.

Another aspect of the invention is related to a positive electrode for a lithium ion battery in which the positive electrode active material for a lithium ion battery according to the invention is used.

Still another aspect of the invention is related to a lithium ion battery in which the positive electrode for a lithium ion battery according to the invention is used.

Advantageous Effect of the Invention

According to the invention, a positive electrode active material for a lithium ion battery with excellent battery characteristics can be provided.

DESCRIPTION OF THE PREFERRED EMBODIMENTS (Constitution of a Positive Electrode Active Material for a Lithium Ion Battery)

As for the material of the positive electrode active material for a lithium ion battery of the invention, a compound generally known to be useful as a positive electrode active material for a positive electrode for a lithium ion battery can be used. However, lithium-containing transition metal oxides like lithium cobaltate ($LiCoO_2$), lithium nickelate ($LiNiO_2$), and lithium manganate ($LiMn_2O_4$) are particularly preferably used. The positive electrode active material for a lithium ion battery of the invention that is produced using such material is represented by the following composition formula:

$$Li_xNi_{1-y}M_yO_{2+\alpha}$$

(in the formula, M represents at least one selected from Sc, Ti, V, Cr, Mn, Fe, Co, Cu, Zn, Ga, Ge, Al, Bi, Sn, Mg, Ca, B, and Zr, $0.9 \leq x \leq 1.2$, $0 < y \leq 0.7$, and $\alpha > 0.1$).

Ratio of lithium per the entire metals in the positive electrode active material for a lithium ion battery is from 0.9 to 1.2. When it is lower than 0.9, it is difficult to maintain a stable crystal structure. On the other hand, when it is more than 1.2, high capacity cannot be obtained from the battery.

With regard to the positive electrode active material for a lithium ion battery of the invention, the oxygen is represented by $O_{2+\alpha}$ ($\alpha>0.1$) in the composition formula as shown above, and therefore, the oxygen is contained in an excess amount. When it is used for a lithium ion battery, battery characteristics like capacity, rate characteristics, and capacity retention ratio are improved. With regard to $\alpha$, it is preferable that $\alpha>0.15$. It is more preferable that $\alpha>0.20$.

According to the positive electrode active material for a lithium ion battery of the invention, in powder X-ray diffraction, ratio of peak strength (Ps104) on (104) plane to peak strength (Ps003) on (003) plane, that is, (Ps104/Ps003), is 0.9 or less. When the peak strength ratio (Ps104/Ps003) is 0.9 or less, divalent Ni ion is incorporated to Li site, lowering so-called cation mixing amount, and therefore desirable. Further, the peak strength (Ps104/Ps003) is more preferably 0.85 or less.

According to the positive electrode active material for a lithium ion battery of the invention, 2θ of (110) plane is 64.6° or more. When 2θ of (110) plane is 64.6° or more, electron conductivity of the powder is improved, and therefore desirable. Further, 2θ of (110) plane is more preferably 64.7° or more.

According to the positive electrode active material for a lithium ion battery of the invention, 2θ of (018) plane is shifted to a lower angle, that is, it is 64.4° or less when molar ratio of Ni is less than 50%, and it is 64.45° or less when molar ratio of Ni is 50% or more. When there is a difference occurring in 2θ between (018) plane and (110) plane, the larger the difference is, the better the crystallinity is, and also it indicates that oxygen is present in non-lost state in crystals (including excessively included case) as a result of even calcination. From such point of view, in the positive electrode active material for a lithium ion battery of the invention, difference in 2θ between (018) plane and (110) plane is preferably greater than 0.1°. It is preferably 0.6° or more when molar ratio of Ni is less than 50%, and more preferably 0.4° or more when molar ratio of Ni is the same or more than 50%. In any of two cases, the difference in peak position on both surfaces is larger. This result indicates that, as a result of having excellent crystallinity and even calcination, the oxygen is present in non-lost state in the crystals (including excessively included case).

2θ of (018) plane is typically from 64.2 to 64.45°.

The difference in 2θ between (018) plane and (110) plane is more preferably greater than 0.5°, and typically from 0.4 to 1.0°.

The positive electrode active material for a lithium ion battery contains primary particles, secondary particles that are formed by aggregation of primary particles, or a mixture of the primary particles and the secondary particles. The average particle diameter of the primary particles and the secondary particles of the positive electrode active material for a lithium ion battery is preferably from 2 to 15 μm.

When the average particle diameter is less than 2 μm, coating on a current collector is difficult to be achieved. On the other hand, when the average particle diameter is more than 15 μm, voids may be easily formed during charging, and thus the charging property is degraded. Further, the average particle diameter is more preferably from 3 to 10 μm.

(Positive Electrode for a Lithium Ion Battery and Constitution of a Lithium Ion Battery Using it)

The positive electrode for a lithium ion battery according to the embodiment of the invention has a constitution in which, for example, a positive electrode mixture prepared by mixing the positive electrode active material for a lithium ion battery with a constitution described above, a conductive assistant, and a binder is formed on one side or both sides of a current collector made of an aluminum foil or the like. The lithium ion battery according to the embodiment of the invention is equipped with the positive electrode for a lithium ion battery which has the constitution as described above.

(Method for Manufacturing a Positive Electrode Active Material for a Lithium Ion Battery)

Next, a method for manufacturing the positive electrode active material for a lithium ion battery according to the embodiment of the invention is explained in greater detail.

First, a metal salt solution is prepared. The metal is Ni and at least one selected from Sc, Ti, V, Cr, Mn, Fe, Co, Cu, Zn, Ga, Ge, Al, Bi, Sn, Mg, Ca, B, and Zr. Further, examples of the metal salt include sulfate, chloride, nitrate, and acetate. Nitrate is particularly preferable. The reason is due to the fact that, since it can be calcined as it is even when incorporated as impurities into a raw material for calcination, the washing process can be omitted, and being capable of functioning as an oxidizing agent, the nitrate has an effect of promoting oxidation of metals that are contained in a raw material for calcination. Each metal contained in metal salt is controlled in advance to have desired molar ratio. Accordingly, molar ratio of each metal in the positive electrode active material is decided.

Next, lithium carbonate is suspended in pure water. After that, it is added with a metal salt solution containing the metal described above to prepare slurry of metal carbonate solution. At that time, lithium-containing carbonate microparticles are precipitated in the slurry. Further, when the lithium compound does not react during heat treatment, like sulfate salt and chloride salt as a metal salt, it is washed with saturated lithium carbonate solution followed by separation with filtration. When the lithium compound reacts as a lithium raw material during heat treatment, like nitrate salt and acetate salt, it is separated by filtration by itself without washing and dried to be used as a precursor for calcination.

Next, by drying the lithium-containing carbonate salt obtained after separation with filtration, a composite of lithium salt (that is, precursor of a positive electrode material for a lithium ion battery) is obtained as powder.

Next, a calcination vessel with a pre-determined volume is prepared and precursor powder of the positive electrode material for a lithium ion battery is filled in the vessel. Then, the calcination vessel filled with the precursor powder of a positive electrode material for a lithium ion battery is set in a calcination furnace and calcined. The calcination is carried out by maintaining it under heating for a pre-determined time in an oxygen atmosphere. Further, when the calcination is carried out under pressure like 101 to 202 KPa, oxygen amount in the composition is further increased, and therefore desirable. When dried powder obtained by sufficiently removing moisture is used as precursor powder of a positive electrode material for a lithium ion battery, an empty space can be easily generated in powder. Further, by filling the powder in a sagger without applying any pressure as much as possible, a composition containing oxygen in sufficiently excessive amount can be obtained. According to conventional techniques, when moisture is not removed at sufficient level, heat cannot be transferred to the inside during calcination, yielding uneven composition, and therefore it is allowed to fill only 50% or so of the total volume of a sagger. However, according to calcination of the sagger filled to at least 80%, as described above, a composition containing oxygen in a sufficient amount can be obtained. Further, according to the manufacturing method, 2θ of (110) plane, 2θ of (018) plane, difference in 2θ between (018) plane and (110) plane, and the like of the positive electrode active material can be controlled.

After that, the powder is taken out of the calcination vessel and pulverized to give powder of the positive electrode active material.

EXAMPLES

Herein below, examples are given for better understanding of the invention and advantages thereof. However, it is clear that the invention is not limited to the examples.

Examples 1 to 15

First, lithium carbonate with an addition amount described in Table 1 was suspended in 3.2 liter of pure water, and then added with 4.8 liter of a solution of metal salt. Regarding the solution of metal salt, hydrate of nitrate salt of each metal was adjusted to have the compositional ratio described in Table 1 and the total molar number of metals was adjusted to 14 moles.

Further, suspension amount of lithium carbonate is an amount of the product (a positive electrode material for a lithium ion secondary battery, that is, a positive electrode active material) which makes x in $Li_xNi_{1-y}M_yO_{2+\alpha}$ the numerical values of Table 1, and each of them was calculated based on the following formula.

$$W(g) = 73.9 \times 14 \times (1+0.5X) \times A$$

In the above formula, the term "A" represents a multiplying number for subtracting, from the suspension amount in advance, a lithium amount originating from a lithium compound other than the lithium carbonate which remains in the raw material after filtration, in addition to the amount required for precipitation reaction. For a case in which the lithium salt reacts as a raw material for calcination like nitrate salt and acetate salt, "A" is 0.9. For a case in which the lithium salt does not react as a raw material for calcination like sulfate salt and chloride, "A" is 1.0.

By this treatment, lithium-containing carbonate salt was precipitated as microparticles in the solution, and the precipitates were separated by filtration using a filter press.

Subsequently, the precipitates were dried to give lithium-containing carbonate salt (that is, precursor for the positive electrode material of a lithium ion battery).

Next, the calcination vessel was prepared and it was filled with the lithium-containing carbonate salt. Thereafter, the calcination vessel was set in a calcination furnace under normal pressure and oxygen atmosphere. After maintaining the heating at the calcination temperature described in Table 1 for 10 hours followed by cooling, oxides were obtained. Thereafter, the oxides obtained were degraded to give powder of the positive electrode material for a lithium ion secondary battery.

Example 16

In Example 16, the same treatment as Examples 1 to 15 was performed except that each metal as a raw material is adjusted to have the composition shown in Table 1, metal salt is provided as chloride, and the lithium-containing carbonate salt is precipitated, washed with saturated lithium carbonate solution, and filtered.

Example 17

In Example 17, the same treatment as Examples 1 to 15 was performed except that each metal as a raw material is adjusted to have the composition shown in Table 1, metal salt is provided as sulfate, and the lithium-containing carbonate salt is precipitated, washed with saturated lithium carbonate solution, and filtered.

Example 18

In Example 18, the same treatment as Examples 1 to 15 was performed except that each metal as a raw material is adjusted to have the composition shown in Table 1 and calcination is performed not under normal pressure but under pressurized condition like 1,200 KPa.

Comparative Examples 1 to 6

In Comparative Examples 1 to 6, the same treatment as Examples 1 to 15 was performed except that each metal as a raw material is adjusted to have the composition shown in Table 1 and calcination is performed not in a furnace under oxygen atmosphere but in a furnace under air atmosphere.

(Evaluation)

Metal content in each positive electrode material was measured by inductively coupled plasma optical emission spectrometry (ICP-OES) and compositional ratio (that is, molar ratio) of each element was calculated. Further, oxygen content was measured by LECO method and then α was calculated.

Powder of each positive electrode material was collected and peak strength (Ps003) of (003) plane and peak strength (Ps104) of (104) plane were measured by powder X-ray diffractometer (CuKα radiation, voltage 40 V, and current 30 A), and then the ratio (Ps104/Ps003) was calculated. In addition, 2θ of (110) plane and 2θ of (018) plane were also measured by powder X-ray diffractometer. From their measurement results, the difference in 2θ between (018) plane and (110) plane was calculated.

Each positive electrode material, a conductive material, and a binder were weighed to have the ratio of 85:8:7. To an organic solvent (N-methyl pyrrolidone) in which the binder is dissolved, the positive electrode material and conductive material were added to give slurry, which was then coated on an Al foil. After drying and a press treatment, it was provided as a positive electrode. Subsequently, 2032 type coin cell having Li as a counter electrode was prepared for evaluation. Using an electrolyte liquid in which $1M-LiPF_6$ is dissolved in EC-DMC (1:1), discharge capacity at current density of 0.2 C was measured. Further, the ratio of discharge capacity at current density of 2 C compared to battery capacity at current density of 0.2 C was calculated to obtain rate characteristics. In addition, capacity retention ratio was measured by comparing the initial discharge capacity obtained at room temperature with discharge current of 1 C to the discharge capacity after one hundred cycles. The results obtained were given in Tables 1 and 2.

TABLE 1

|  | suspension amount of lithium carbonate (g) | compositional ratio of each element in all metals except Li | | | | | | | | | maintaining temperature (° C.) | x | α |
|---|---|---|---|---|---|---|---|---|---|---|---|---|---|
|  |  | Ni | Co | Mn | Ti | Cr | Fe | Cu | Al | Sn | Mg |  |  |  |
| Example 1 | 1393 | 33.3 | 33.3 | 33.3 | | | | | | | | 1000 | 1.00 | 0.15 |
| Example 2 | 1393 | 33.3 | 33.3 | 33.3 | | | | | | | | 1020 | 1.00 | 0.10 |
| Example 3 | 1393 | 33.3 | 33.3 | 33.3 | | | | | | | | 980 | 1.00 | 0.25 |

TABLE 1-continued

|  | suspension amount of lithium carbonate (g) | compositional ratio of each element in all metals except Li | | | | | | | | | | maintaining temperature (° C.) | x | α |
|---|---|---|---|---|---|---|---|---|---|---|---|---|---|---|
|  |  | Ni | Co | Mn | Ti | Cr | Fe | Cu | Al | Sn | Mg |  |  |  |
| Example 4 | 1393 | 33.3 | 33.3 | 33.3 |  |  |  |  |  |  |  | 950 | 1.00 | 0.30 |
| Example 5 | 1393 | 33.3 | 33.3 | 33.3 |  |  |  |  |  |  |  | 930 | 1.00 | 0.35 |
| Example 6 | 1393 | 33.3 | 33.3 | 33.3 |  |  |  |  |  |  |  | 900 | 1.00 | 0.40 |
| Example 7 | 1350 | 33.3 | 33.3 | 33.3 |  |  |  |  |  |  |  | 1000 | 0.90 | 0.11 |
| Example 8 | 1490 | 33.3 | 33.3 | 33.3 |  |  |  |  |  |  |  | 950 | 1.20 | 0.30 |
| Example 9 | 1393 | 33 | 33 | 33 |  |  |  |  | 1 |  |  | 1000 | 1.00 | 0.13 |
| Example 10 | 1393 | 80 | 10 | 10 |  |  |  |  |  |  |  | 800 | 1.00 | 0.16 |
| Example 11 | 1393 | 80 | 15 |  | 2.5 |  |  |  |  |  | 2.5 | 750 | 1.00 | 0.16 |
| Example 12 | 1393 | 80 | 15 |  |  | 5 |  |  |  |  |  | 750 | 1.00 | 0.18 |
| Example 13 | 1393 | 80 | 15 |  |  |  | 5 |  |  |  |  | 750 | 1.00 | 0.17 |
| Example 14 | 1393 | 80 | 15 |  |  |  |  |  | 5 |  |  | 750 | 1.00 | 0.17 |
| Example 15 | 1393 | 80 | 15 |  |  |  |  | 5 |  |  |  | 750 | 1.00 | 0.15 |
| Example 16 | 1552 | 33.3 | 33.3 | 33.3 |  |  |  |  |  |  |  | 1000 | 1.00 | 0.10 |
| Example 17 | 1552 | 33.3 | 33.3 | 33.3 |  |  |  |  |  |  |  | 1000 | 1.00 | 0.11 |
| Example 18 | 1393 | 33.3 | 33.3 | 33.3 |  |  |  |  |  |  |  | 1000 | 1.00 | 0.30 |
| Comparative Example 1 | 1393 | 33.3 | 33.3 | 33.3 |  |  |  |  |  |  |  | 1000 | 1.00 | 0.00 |
| Comparative Example 2 | 1393 | 33.3 | 33.3 | 33.3 |  |  |  |  |  |  |  | 1050 | 1.00 | −0.02 |
| Comparative Example 3 | 1393 | 33.3 | 33.3 | 33.3 |  |  |  |  |  |  |  | 980 | 1.00 | 0.06 |
| Comparative Example 4 | 1393 | 80 | 10 | 10 |  |  |  |  |  |  |  | 800 | 1.00 | 0.00 |
| Comparative Example 5 | 1393 | 80 | 15 |  | 2.5 |  |  |  |  |  | 2.5 | 750 | 1.00 | 0.00 |
| Comparative Example 6 | 1393 | 80 | 15 |  |  |  |  | 5 |  |  |  | 750 | 1.00 | 0.00 |

TABLE 2

|  | Ps104/Ps003 | 2θ of (018)plane (°): a | 2θ of (110)plane (°): b | difference in 2θ (°): b − a | discharge capacity (mAh/g) | rate characteristics (%) | capacity retention ratio (%) |
|---|---|---|---|---|---|---|---|
| Example 1 | 0.82 | 64.36 | 65.06 | 0.70 | 155 | 94 | 90 |
| Example 2 | 0.85 | 64.33 | 65.04 | 0.71 | 153 | 92 | 90 |
| Example 3 | 0.78 | 64.35 | 65.06 | 0.71 | 155 | 95 | 91 |
| Example 4 | 0.76 | 64.40 | 65.11 | 0.71 | 155 | 94 | 92 |
| Example 5 | 0.75 | 64.39 | 65.12 | 0.73 | 154 | 95 | 91 |
| Example 6 | 0.75 | 64.40 | 65.14 | 0.74 | 153 | 95 | 91 |
| Example 7 | 0.88 | 64.28 | 65.03 | 0.75 | 160 | 91 | 88 |
| Example 8 | 0.77 | 64.26 | 65.25 | 0.99 | 150 | 95 | 92 |
| Example 9 | 0.81 | 64.25 | 65.06 | 0.81 | 153 | 93 | 90 |
| Example 10 | 0.84 | 64.37 | 64.80 | 0.43 | 185 | 90 | 85 |
| Example 11 | 0.78 | 64.40 | 64.96 | 0.56 | 190 | 87 | 85 |
| Example 12 | 0.86 | 64.41 | 64.97 | 0.56 | 187 | 87 | 84 |
| Example 13 | 0.85 | 64.40 | 64.95 | 0.55 | 180 | 85 | 82 |
| Example 14 | 0.78 | 64.35 | 64.97 | 0.62 | 190 | 89 | 82 |
| Example 15 | 0.88 | 64.36 | 64.92 | 0.56 | 178 | 85 | 82 |
| Example 16 | 0.86 | 64.40 | 65.05 | 0.65 | 153 | 93 | 90 |
| Example 17 | 0.87 | 64.39 | 65.05 | 0.66 | 152 | 93 | 90 |
| Example 18 | 0.75 | 64.21 | 65.10 | 0.89 | 155 | 95 | 92 |
| Comparative Example 1 | 0.94 | 64.63 | 65.02 | 0.39 | 150 | 90 | 85 |
| Comparative Example 2 | 1.02 | 64.45 | 65.03 | 0.58 | 148 | 89 | 83 |
| Comparative Example 3 | 0.93 | 64.43 | 64.95 | 0.52 | 150 | 90 | 85 |
| Comparative Example 4 | 0.95 | 64.66 | 64.69 | 0.03 | 175 | 83 | 80 |
| Comparative Example 5 | 0.98 | 64.50 | 64.85 | 0.35 | 175 | 80 | 80 |
| Comparative Example 6 | 0.96 | 64.50 | 64.83 | 0.33 | 173 | 78 | 77 |

What is claimed is:

1. A positive electrode active material for a lithium ion battery which is represented by the following composition formula:

$Li_xNi_{1-y}M_yO_{2+\alpha}$:

wherein M represents Co as an essential component and at least one selected from Sc, Ti, V, Cr, Mn, Fe, Cu, Zn, Ga, Ge, Bi, Sn, Mg, Ca, B, and Zr:

wherein $0.9 \leq x \leq 1.2$, $0 < y \leq 0.7$, and $\alpha \geq 0.1$:

wherein ratio of peak strength (Ps104) on (104) plane to peak strength (Ps003) on (003) plane, which is (Ps104/Ps003), is 0.9 or less: and 2Θ of (110) plane is 64.6° or more according to powder X-ray diffraction.

2. The positive electrode active material for a lithium ion battery of claim 1, wherein M comprises Mn and Co.

3. The positive electrode active material for a lithium ion battery of claim 1 or 2, wherein α>0.15 in the composition formula.

4. The positive electrode active material for a lithium ion battery of claim 3, wherein α>0.20 in the composition formula.

5. The positive electrode active material for a lithium ion battery of claim 1 or 2, wherein ratio of peak strength (Ps104/Ps003) is 0.85 or less.

6. The positive electrode active material for a lithium ion battery of claim 5, wherein 2Θ of (110) plane is 64.7° or more.

7. The positive electrode active material for a lithium ion battery of claim 1 or 2, wherein 2θ of (018) plane is 64.45° or less and difference in 2Θ between (018) plane and (110) plane is more than 0.1°.

8. A positive electrode for a lithium ion battery in which the positive electrode active material for a lithium ion battery of claim 1 or 2 is used.

9. A lithium ion battery in which the positive electrode for a lithium ion battery of claim 8 is used.

\* \* \* \* \*